(12) United States Patent
Sakai et al.

(10) Patent No.: US 6,496,397 B2
(45) Date of Patent: Dec. 17, 2002

(54) INVERTER DEVICE

(75) Inventors: Keijiro Sakai, Kanasagou-machi (JP);
Toshiaki Okuyama, Tokai-mura (JP);
Kinya Nakatsu, Hitachi (JP); Seiji Ishida, Hitachi (JP); Hiroshi Fujii, Chiba (JP); Junji Kato, Narashino (JP); Masahiro Hiraga, Yotsukaido (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/826,857

(22) Filed: Apr. 6, 2001

(65) Prior Publication Data
US 2001/0043481 A1 Nov. 22, 2001

(30) Foreign Application Priority Data
Apr. 27, 2000 (JP) .......................... 2000-132843

(51) Int. Cl.[7] .......................... H02M 7/537; H02M 7/44
(52) U.S. Cl. .......................... 363/131; 363/98
(58) Field of Search .................. 363/131, 132, 363/127, 98, 97, 17, 25, 26; 318/434, 811, 810, 801, 799

(56) References Cited

U.S. PATENT DOCUMENTS

| | | | |
|---|---|---|---|
| 4,777,578 A | * 10/1988 | Jahns | 363/98 |
| 4,926,104 A | * 5/1990 | King et al. | 318/599 |
| 6,060,859 A | * 5/2000 | Jonokuchi | 318/801 |

FOREIGN PATENT DOCUMENTS

| | | | |
|---|---|---|---|
| JP | 615526 | * | 5/1994 |
| JP | 819263 | * | 1/1996 |

* cited by examiner

*Primary Examiner*—Rajnikant B. Patel
(74) *Attorney, Agent, or Firm*—Antonelli, Terry, Stout & Kraus, LLP (57) ABSTRACT

An inverter device has a three-phase inverter for converting DC electric power into AC power for supplement to an AC electric motor and a control device operatively associated therewith, and the control device includes a phase current detection section for outputting a phase current waveform based on a DC input current and an operational processor section for performing operational processing for control of said inverter device based on the phase current waveform. Thereby, the inverter device can be constructed to be very compact.

5 Claims, 10 Drawing Sheets

FIG. 6a (PERIOD I) ia=-iv ib-iu

FIG. 6b (PERIOD II) ia=-iw ib-iu

FIG. 6c (PERIOD III) ia=-iw ib-iv

FIG. 6d (PERIOD IV) ia=iu ib-iv

FIG. 6e (PERIOD V) ia=iu ib-iw

FIG. 6f (PERIOD VI) ia=-iv ib-iw

INVERTER DEVICE

BACKGROUND OF THE INVENTION

The present invention relates to control devices of inverters for variable-speed control of alternating current (AC) electric motors.

Prior known methods for controlling an inverter of the type that is used for variable-speed drive of induction motors typically include a V/f-constant control technique for controlling an output voltage V1 of the inverter in a way proportional to a primary frequency f1 thereof. With this approach, while it is possible to permit the excitation current of an induction motor to stay substantially constant, application of a load can lead to an increase in voltage potential drop due to the electric motor's primary resistance r1, resulting in a decrease in induced electromotive force of such motor. This would disadvantageously result in a decrease in magnetic flux of the motor, causing the motor's output torque to decrease accordingly. Another problem is that the "real" velocity tends to decrease with respect to a velocity command, resulting in an increase in velocity variability ratios. One approach proposed to avoid these problems is to employ automatic torque boost control techniques for achievement of torque increase in middle and low velocity regions, in particular.

A typical known approach is to detect an electric motor current by use of separate current detectors corresponding in number to two phases, as provided on the inverter output side; then convert in magnetic flux phases this current from stator coordinates into rotating magnetic field coordinates (uvw/dq conversion) to obtain a torque current Iq; then determine through computation a primary resistance voltage drop component r1·Iq in accordance with the current obtained; and, thereafter, calculate a voltage command Vm through addition of it to a V/f-constant voltage (induced electromotive force). In this case, the voltage command is Vm=K·f1*+r1·Iq. Here, K is the proportional gain. Such control for permitting an output voltage value to increase with an increase in current in this way is called "automatic torque boost control." Further, a slip frequency fs in proportion to the torque current can be added to a reference frequency f0* to thereby compute an inverter output frequency command f1*. In this case, f1*=f0*+Ks·Iq. This control is known as slip compensation among those skilled in the art. These schemes suffer from a cost increase due to the fact that two separate current detectors for independent detection of two phases are required on the inverter output side. On the other hand, another scheme is also available for computing the torque current equivalent components from the average value Idc of inverter DC input currents and then performing the torque boost in accordance therewith. This control method constitutes a scheme for detecting Idc to compute an effective power current Iqx approximating the torque current Iq for compensation of the inverter output voltage in accordance with the significance of this current, in view of the fact that Equation 1 is established due to the equality of power on the DC side of the inverter to that on the AC side thereof.

$$Vdc \cdot Idc = 3V1 \cdot I1 \cdot \cos\varphi \qquad (1)$$
$$= 3V1 \cdot Iqx$$

Here in the Equation 1, Vdc is the DC voltage of an inverter, Idc is the DC current average value, V1 represents the significance of an inverter output voltage (phase voltage), I1 represents the significance of an electric motor current, and $\cos\phi$ is the power factor. However, in AC electric motors, such as induction motors, the output voltage V1 is to be controlled in a way substantially proportional to the inverter frequency in order to control the value of V/f so that it remains constant. Due to this, V1 decreases in low speed regions, resulting in a noticeable decrease in Idc, as apparent from Equation 1 above. Accordingly, the effective power equivalent current Iqx decreases in detection accuracy, which disadvantageously poses a problem in that the automatic torque boost control decreases in accuracy.

Alternatively, current limit control is designed to detect three phase components of an inverter output current; and, when a current value goes beyond a pre-specified current limit level even with respect to one phase thereof, the inverter output frequency is reduced to thereby lower the slip frequency of an induction electric motor for causing the motor current to stay below the limit level, thus preventing occurrence of unwanted over-current trip phenomena. In this case, at least two motor current sensors are required.

Due to this, several schemes for computation and detection of the inverter's output current from a DC input current(s) of the inverter to satisfy electric motor sensorless design requirements have been proposed to date, such as for example those as disclosed in Japanese Patent Laid-open Nos. 8-19263 and 6-153526, and IEE Proceedings Vol. 136, No. 4, Jul. 1989 Pages 196–204. Also, some important teachings as to the relation among the inverter's DC input current and output current plus gate states have been recited in Journal "D" of the Institute of Electrical Engineers of Japan, "Smoothing Capacitor's Capacitance Reduction and Rapid Stop/Restartup Control Method for Voltage-Type PWM Converters," (Apr. 1, 1992) at page 33.

In these electric motor current sensorless techniques, as recited in the above-identified Japanese documents, the one described in Japanese Patent Laid-open No. 8-19263 is designed to sample-hold a DC current in all the gate states once at a time whenever a gate state changes, resulting in an output of a sample-hold circuit varying whenever the gate state changes. Further, a difference (DC current change component) between two sample-hold circuit output values is computed in units of gate states, which requires the use of "special" A/D converters and microcomputers of the type which may offer high-speed operabilities. As for the technique of Japanese Patent Laid-open No. 6-153526, this Japanese document is completely silent about any practical configuration including the arrangement of sample-hold circuitry and how to make sample-hold signals required. Additionally, the Japanese Patent Laid-open No. 6-153526 teaches inverter output current detection methodology; however, it fails to teach current limit control and automatic torque boost control methods.

SUMMARY OF THE INVENTION

The present invention has been made in view of the above problems and its object is to provide a control device for use with an inverter operable to detect from the inverter's DC input current the amplitude of an electric motor current along with a torque current and/or excitation current thereof, and then using them to perform current limit control, automatic torque boost control, or velocity sensorless vector control and the like.

An inverter device in accordance with the present invention comprises a three-phase inverter which converts DC electric power into AC power as a supplement to an AC electric motor, and a control device operatively associated therewith. The control device includes a phase current detection section for outputting a phase current waveform based on a DC input current, and an arithmetic or operational processing section based on the phase current waveform for performing operational processing tasks for control of the inverter device.

According to the present invention, since a three-phase AC phase current is detected on the basis of the DC input current, it will no longer be necessary to provide a current detector for each phase. Owing to this, the inverter device may be reduced in size or lowered in cost. Further, since the inverter is controlled based on the phase current waveform, it is possible to adequately control the inverter without having to speed up the operational processor unit.

A control device of another inverter device also incorporating the principles of the instant invention is arranged to include sample-hold signal creation means for selecting in units of specified phase periods of inverter output voltage phases—for example, 60- or 120-degree phase periods—one gate state from among gate states for causing a positive side arm switching element or a negative side arm switching element of a three-phase inverter to turn on only within a time period corresponding to one phase of three phases thereof, and also from gate states for causing it turn on within periods corresponding to two phases (six kinds of gate states in total since each consists of three kinds), and a sample-hold circuit for sample-holding an inverter DC input current in the one gate state as selected. Whereby, an output of the sample-hold circuit is rendered variable continuously in a way synchronous with the electric motor current within a time period corresponding to the specified phase of the inverter output voltage phases.

A control device of another inverter device in accordance with this invention includes a first sample-hold circuit for sample-holding a DC input current of an inverter in a gate state that causes a positive side arm switching element or negative side arm switching element of a three-phase inverter to turn on within a period corresponding to only one phase while letting it turn off within periods corresponding to the remaining two phases thereof, and a second sample-hold circuit for sample-holding a DC input current in a gate state that causes it turn on within periods corresponding to two phases while turning it off within a period corresponding to the remaining one phase thereof. With such an arrangement also, an output of the sample-hold circuit is made variable continuously in synchronism with the electric motor current within the time period equivalent to the specified phase period of the inverter output voltage phases.

For the purposes of current limit control, the control device of the inverter device in accordance with the present invention is further arranged to reduce the inverter's output frequency when any one of the output values of the first and second sample-hold circuits goes beyond the preset level. Whereby, the resultant slip frequency of an induction electric motor decreases, thus making it possible to achieve the intended current limit at high speeds.

For the torque boost control, the control device of the inverter device in the present invention is further arranged to provide means for calculating a torque current and/or excitation current of an AC electric motor on the basis of a reference phase with an inverter output frequency command integrated and the first and second sample-hold circuit output values, and means for varying an output frequency or output voltage of the inverter in accordance with a calculated value. Whereby, it is possible to achieve the intended torque increase (automatic torque boost control) by letting the inverter output voltage increase with an increase in torque-component current upon increasing of the load. Furthermore, it is possible to reduce the deviation of a real speed or velocity with respect to a velocity command due to slip compensation for allowing the inverter output frequency to increase with an increase in torque current.

DETAILED DESCRIPTION OF THE PREFERRED EMBODIMENT

Preferred embodiments of the present invention will be explained based on the accompanying figures of the drawing.

Embodiment 1

Figure 1:
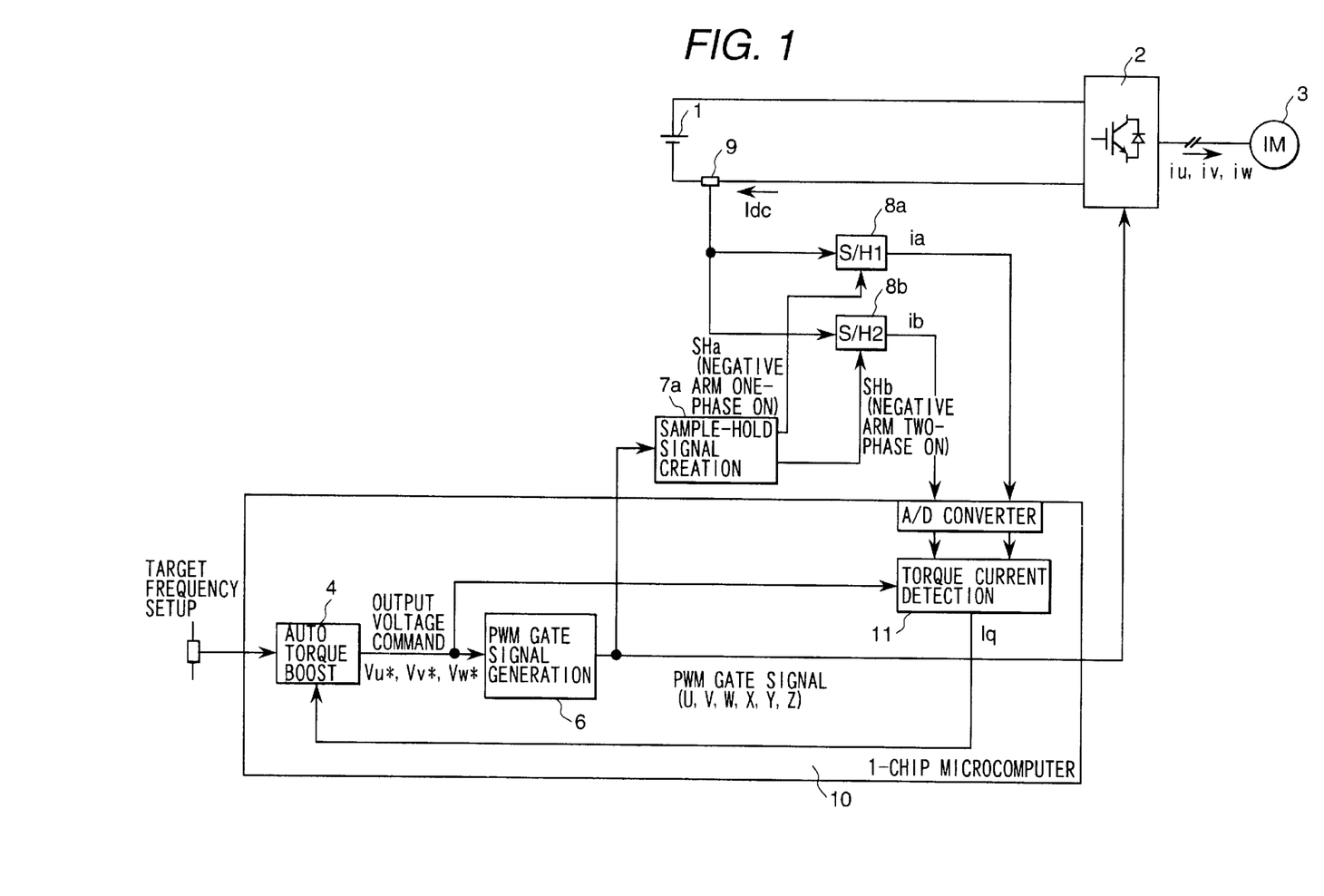
FIG. 1 is a block diagram showing one embodiment of the present invention.

In FIG. 1, a direct current •DC) voltage of a DC power supply 1 is converted by a three-phase inverter 2 into an alternate current (AC) voltage which is variable in frequency and voltage potential for variable-speed drive of an electric motor 3 of the induction type. An automatic torque boost means 4 is operable to output three-phase AC voltage commands Vu*, Vv*, Vw* of the inverter on the basis of an output of a target frequency setter 5 and a torque current calculation value Iq. In addition, a PWM gate signal generation means 6 outputs more than one PWM gate signal based on the three-phase AC voltage commands, which signals are then supplied to the inverter 2. A sample-hold signal creation means 7a, based on the PWM gate signal, generates sample-hold signals for sample-hold circuits 8a, 8b for sampling and holding an output of a DC current detector 9. A one-chip microcomputer 10 with a built-in analog/digital converter (A/D converter) receives outputs "ia" and "ib" of the sample-hold circuits at the Analog/digital converter (A/D converter), and then detects a torque current Iq using a torque current detector means 11 to thereby perform automatic torque boost control on the basis of this detected current.

Figure 2A:
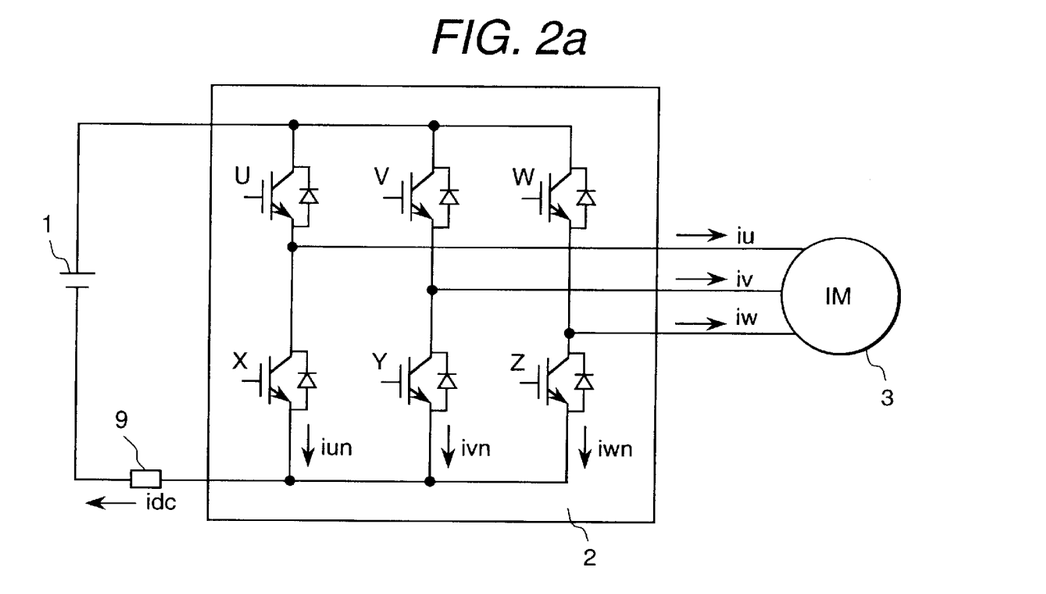
FIG. 2a is a schematic circuit diagram of a three-phase inverter and FIG. 2b is a showing a relation of inverter DC input current versus electric motor current.
Figure 2B:
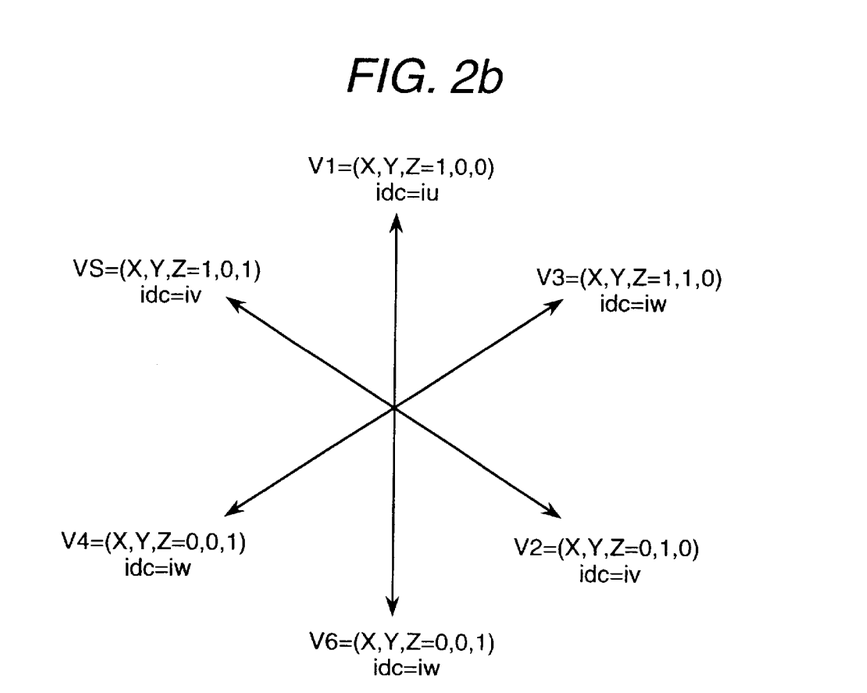

An explanation will next be given of electric motor current components that are contained in a DC current "idc" with reference to FIGS. 2a and 2b. The three-phase inverter 2 is generally constituted from six semiconductor switching elements and six circulation or "ring" current diodes, wherein positive arm gate signals are U, V, W, whereas negative arm gate signals are X, Y, Z. As apparent from FIG. 2(b), the DC current idc is given by Equation 2 below.

$$idc = iun + ivn + iwn \quad (2)$$
$$= -iu \cdot X - iv \cdot Y - iw \cdot Z$$

Here, "iu," "iv" and "iw" are motor currents of respective phases, and the gate signals X, Y, Z become 1 when the gate signals are on and 0 when off. In addition, from Equation 2, (X, Y, Z=0, 0, 0) becomes idc=0. Further, when (X, Y, Z=1, 1, 1) the sum of three-phase currents is zero so that idc=0. Thus, six different gate states permitting a flow of current at idc are available as shown in the vector diagram of FIG. 2b, wherein the relation of idc versus motor current is obtained in accordance with a gate state.

Figure 3:
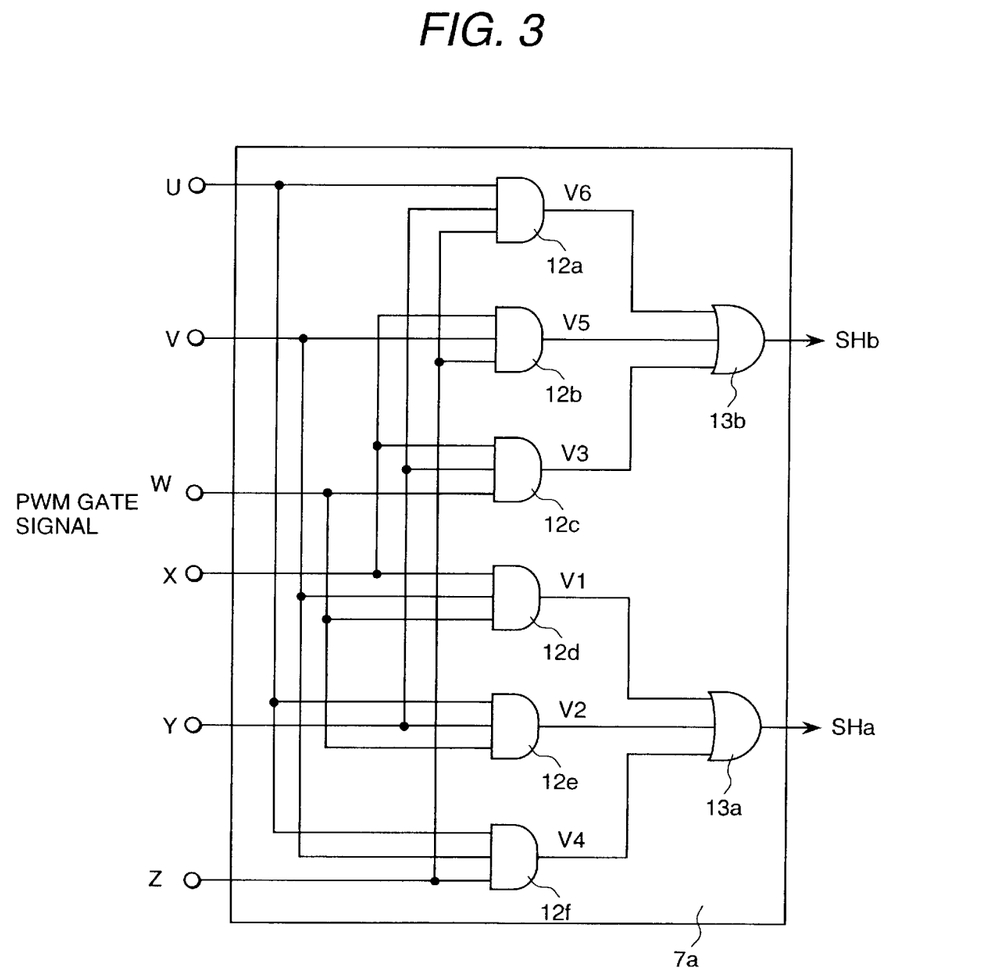
FIG. 3 is a schematic circuit diagram of a sample-hold signal creation means 7a shown in FIG. 1.
Figure 4:
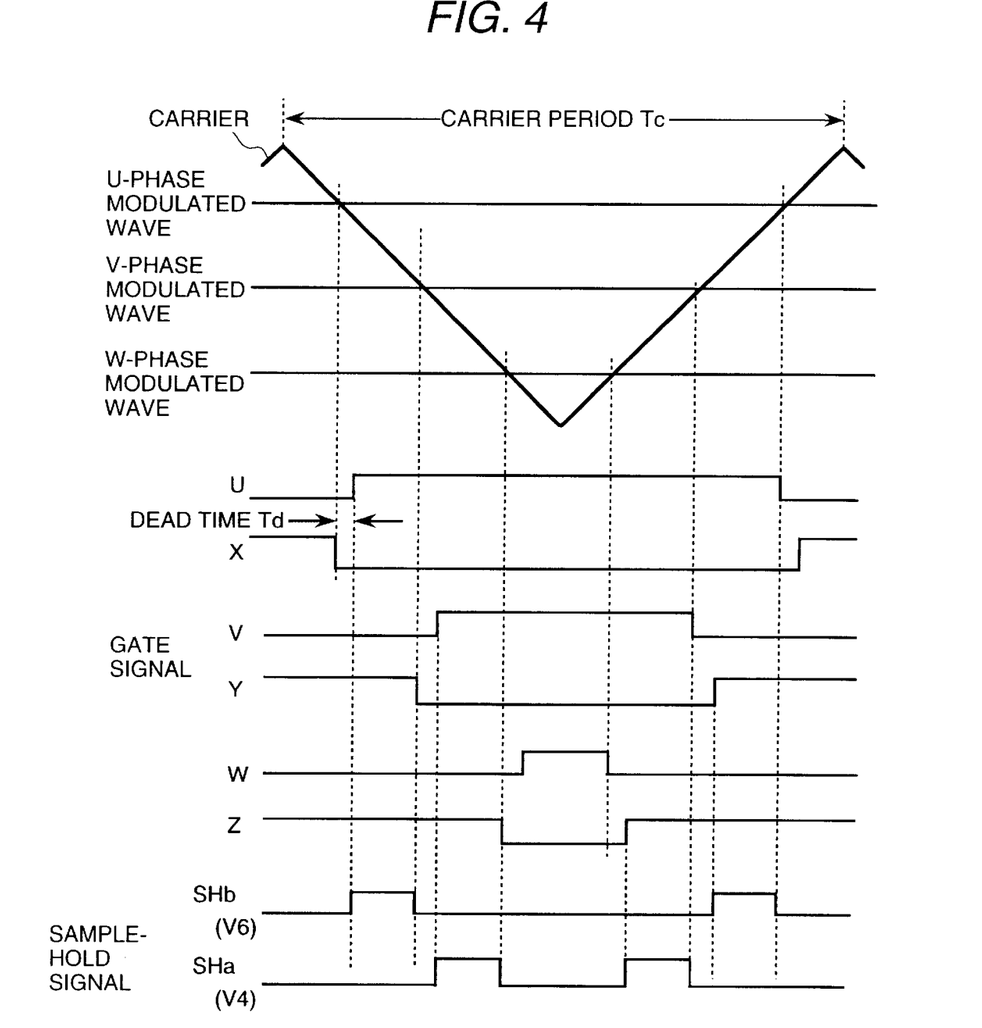
FIG. 4 is a time chart diagram of the sample-hold signal creation means 7a shown in FIG. 3.

Next, a detailed circuit diagram of the sample-hold signal creation means 7a, which is main part of the illustrative embodiment, is shown in FIG. 3. At a logic circuit 12, six different gate states are discriminated for adding at a signal adder 13a those signals of (X, Y, Z=1, 0, 0), (X, Y, Z=0, 1, 0) and (X, Y, Z=0, 0, 1) which cause the inverter's negative arm gate signal to be in the on state only within a time period corresponding to a single phase, thus providing a sample-hold signal SHa. Additionally, signals of (X, Y, Z=1, 1, 0), (X, Y, Z=0, 1, 1), (X, Y, Z=1, 0, 1) which cause the inverter's negative arm gate signal to be in the on state within periods corresponding to two phases thereof are added at an adder 13b thereby providing a sample-hold signal SHb. Practical operation waveforms are shown in FIG. 4. FIG. 4 shows a state in which a U-phase modulation wave corresponding to a voltage command is the most significant, V-phase is the second largest one, and W-phase is the smallest. For the gate signals of X, Y, Z excluding a dead time Td, a state of turn-on of only two phases is represented by the SHb signal, while a state of only one phase turn-on is represented by the SHa signal.

Figure 5:
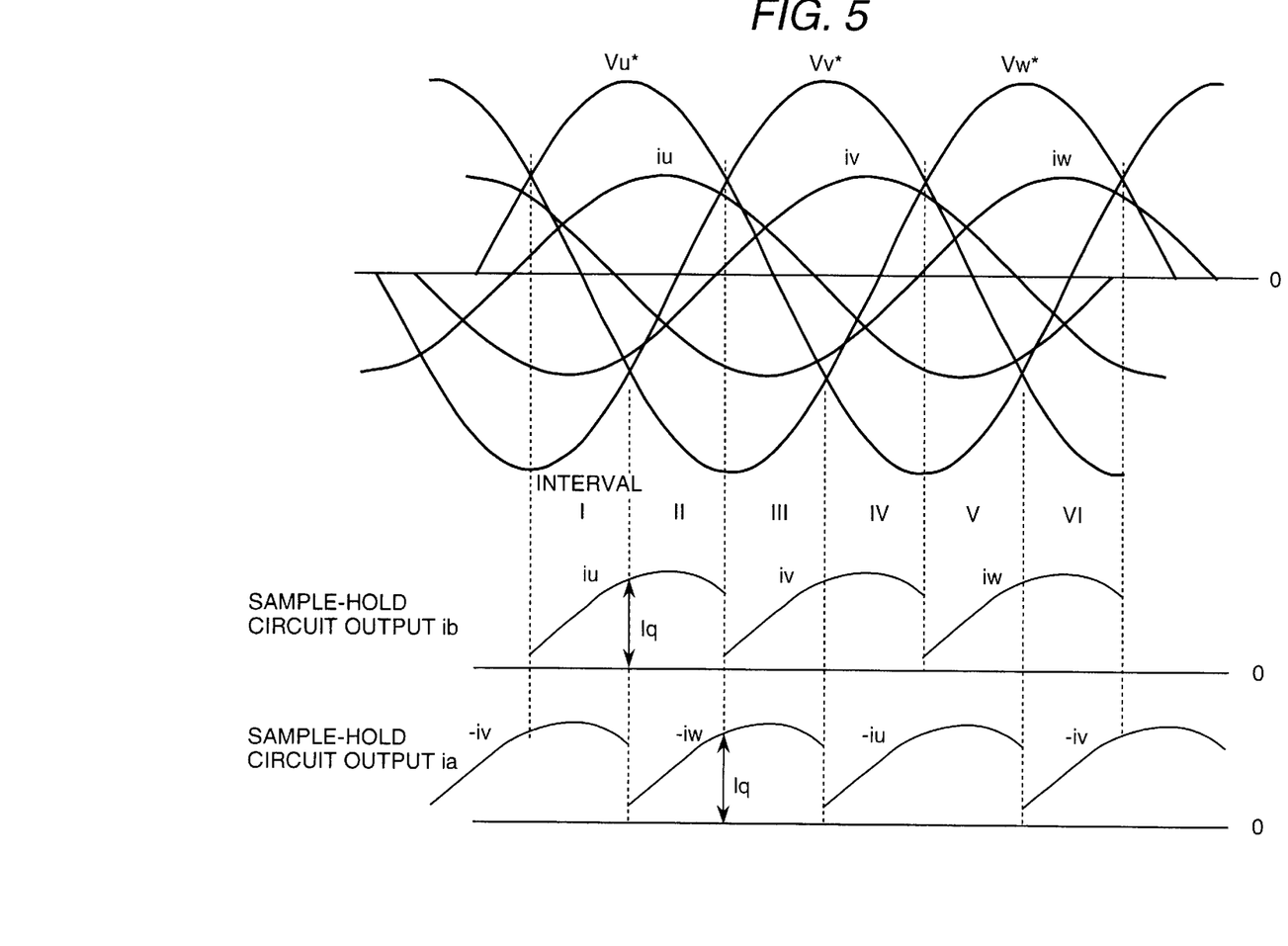
FIG. 5 is an output waveform diagram of sample-hold circuits shown in FIG. 1.
Figure 6A:
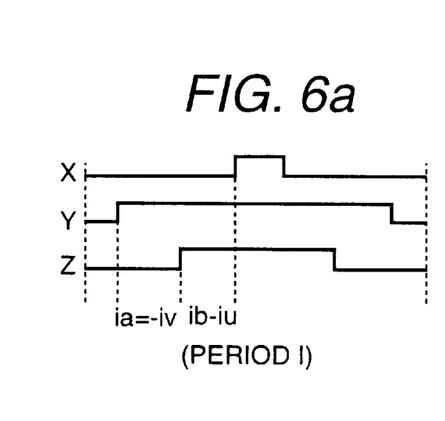
FIG. 6a to FIG. 6f are gate signal waveform diagrams in units of 60° periods shown in FIG. 5.
Figure 6B:
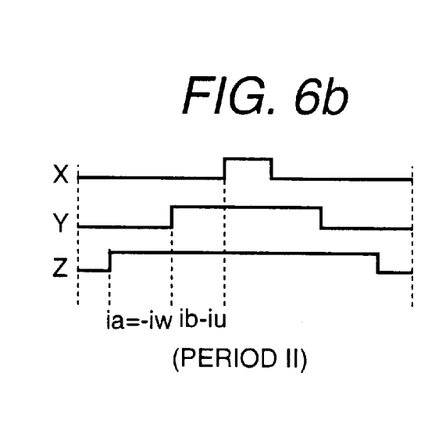
Figure 6C:
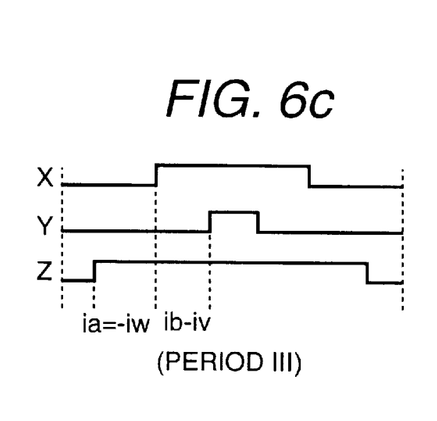
Figure 6D:
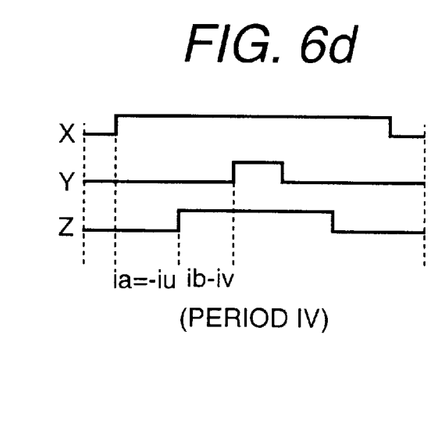
Figure 6E:
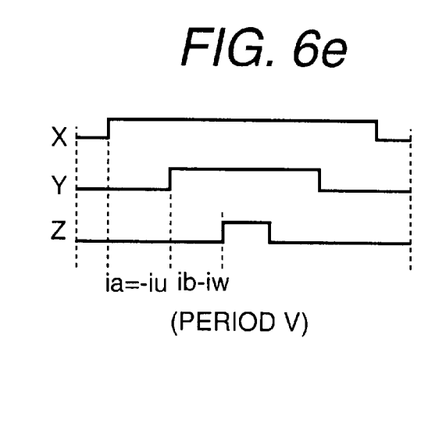
Figure 6F:
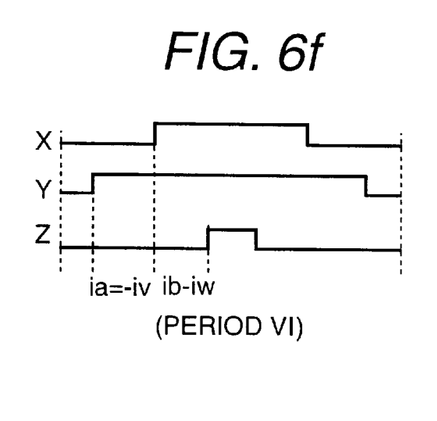

An explanation will next be given of the outputs ia, ib of the sample-hold circuits. FIG. 5 shows waveforms during operation of the electric motor with the motor current phase being delayed from the inverter's output voltage phase. While letting the numbers of 60° phase periods with the waveforms of any two of the three-phase AC voltage commands Vu*, Vv*, Vw* becoming crossed be represented as "I" to "VI," a gate signal waveform within each time interval of 60° is as shown in FIGS. 6a to 6f. For example, the waveforms of FIG. 4 are such that the gate signal X corresponding to an interval II is the narrowest in width whereas Z is the widest. Here, when only one phase of X, Y, Z is in the on state, the sample-hold circuit 8a outputs idc as ia. Alternatively, when only two phases are in the on state, the sample-hold circuit 8b outputs idc as ib. Such idc at this time is given by a calculation of Equation 2, wherein the values of ia, ib in each gate state become as shown in FIGS. 6a and 6b. Representing this by one period of an output voltage of the inverter, the resulting ia, ib waveforms become as shown in FIG. 5. As a result of this, the ib value is such that a current value with an instantaneous value voltage at a maximal phase is output with a 120-degree cycle or period. In addition, the ia value is such that a current value (code inversion value) with the instantaneous value voltage being a minimal phase is output. To be brief, ia and ib are such that a specific value which is identical to the motor current is output with a 120-degree period while letting phases be shifted by 60°. In this way, since the output of the sample-hold circuit varies continuously and moderately while being identical to the motor current within the 120-degree phase period of the inverter output voltage phases, it becomes possible when supplying this signal through A/D conversion to the microcomputer to employ a relatively low-speed responding A/D converter or the microcomputer's built-in A/D converter. As a result, it is possible to realize the intended control device at low cost.

A current limit function will next be explained. As shown in FIG. 5, in the state in which the power factor is relatively large, a specific one of respective phase currents which is the greatest in instantaneous value will be output to ia or ib. For instance, in FIG. 5, the one with the greatest instantaneous current value within the interval I is iv; thus, a value with this code inverted is output to ia. In another interval II, such is iu, which is output to ib. As a result, the maximum value of such instantaneous value selected from among three-phase instantaneous currents will be output to ia or ib. Thus, when either one of ia, ib exceeds a preset level, this is judged as an overload; and then, the inverter output frequency command is reduced. Additionally, the inverter output voltage is also reduced in a way proportional to the inverter output frequency. Whereby, the induction motor's slip frequency decreases causing the inverter output voltage to get smaller accordingly, so that the motor current is limited to thereby enable prevention of any over-current trip.

Next, a method of detecting an effective power-equivalent current Iqx will be explained. Letting the phase of Vu* be θ, iu is given by Equation 3.

$$iu = I1 \cdot \sin(\theta - \varphi) \quad (3)$$
$$= I1 \cdot \sin\theta \cdot \cos\varphi - \cos\theta \cdot \sin\varphi)$$

Here, I1 is the amplitude of current, φ is the power factor angle. Then, from Eq. 3, the maximum value of Vu*, that is, an iu value at θ=90° becomes I1·cosφ, which becomes the effective power-equivalent current Iqx. As this value is equivalent to the torque current Iq of the electric motor, although there are certain errors in low speed regions, the automatic torque boost is performed with this Iqx being replaced by the torque current Iq. A practical Iqx detection method is that shown in FIG. 5, in which the ib value near or around the maximum value of each phase AC voltage is detected as Iqx. Further, the ia value near the minimum value of each phase AC voltage is detected as Iqx. This is achievable due to the fact that the microcomputer arithmetically processes Vu*, Vv*, Vw* and that any phase relating to the maximum value and the minimum value is discriminable. Optionally, the same is also discriminable directly from the phase of a voltage command(s).

Figure 7:
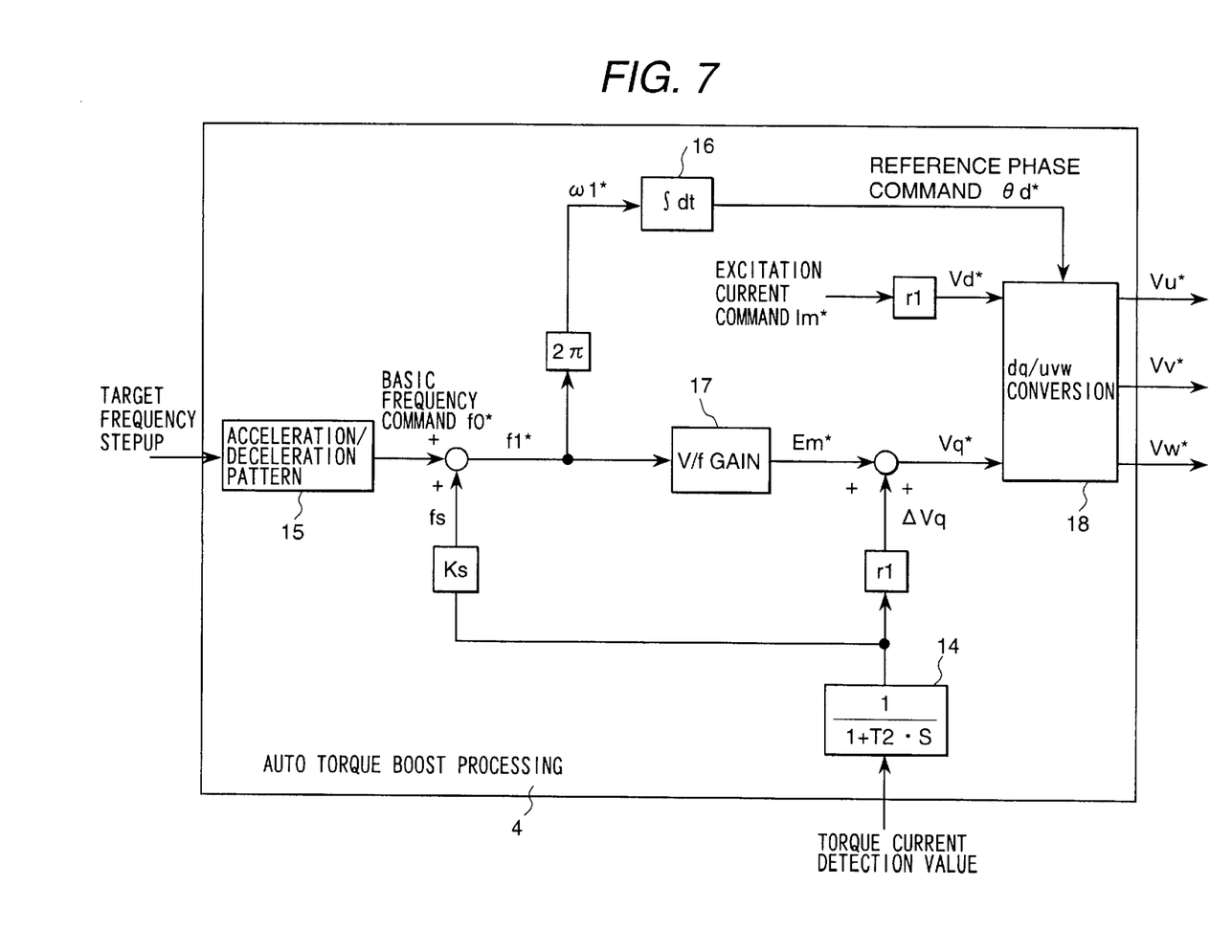
FIG. 7 a block diagram of is an automatic torque boost control processor.

Next, an automatic torque boost control employing the torque current Iq detection value, while letting Iq=Iqx, will be explained with reference to FIG. 7. FIG. 7 shows a configuration of the automatic torque boost means 4. A d-axis voltage command Vd* is used for setting up a fixed voltage of Im*·r1. Here, Im* is the excitation current (motor current upon application of no loads) command value of the induction motor, and r1 is the primary resistance setup gain of the motor. Note that these constants are for setting up electrical constants of the motor of interest which is to be controlled by the inverter. Next, the torque current detection value Iq is multiplied by a proportional gain Ks via a primary delay filter 14 to thereby calculate a slip frequency fs. Note here that the gain Ks is for setup of a value of Ks=fs0/It0 from a rated torque current It0 and rated slip frequency fs0. Next, an acceleration/deceleration pattern generation means 15 inputs a target frequency command and then outputs a fundamental or basic frequency command f0*, to which the slip frequency fs is added thereby outputting an inverter output frequency command f1* (primary frequency command). Adding the slip frequency in this way makes it possible to prevent any possible reduction of real speed or velocity otherwise occurring when the load increases.

In addition, the inverter output frequency command f1* is multiplied by $2\pi$ to obtain a primary angular frequency command $\omega 1^*$ while causing an integrator 16 to integrate $\omega 1^*$ to provide a reference phase command $\theta d^*$.

Next, the inverter output frequency command f1* is inputted and then it is multiplied by V/f-constant gain 17 to thereby output an induction electromotive force command Em*. A q-axis voltage's corrected amount $\Delta Vq$ is obtainable by multiplying the torque current detection value Iq via the primary delay filter 14 by the primary resistance setup gain r1. A q-axis voltage command Vq* is an output with Em* and $\Delta Vq$ added together. Next, a dq/uvw conversion means 18 performs arithmetic processing of voltage commands Vd*, Vq* of rotating magnetic field coordinate axes in a way as defined by Equation 4 to 6, thereby to output the three-phase AC voltage commands Vu*, Vv*, Vw* at the coordinates of a stator.

$$Vu^* = Vd^* \cdot \cos\theta d^* - Vq^* \cdot \sin\theta d^* \tag{4}$$

$$Vw^* = -Vu^*/2 - \sqrt{3}(Vd^* \cdot \sin\theta d^* + Vq^* \cdot \cos\theta d^*)/2 \tag{5}$$

$$Vv^* = -(Vv^* + Vw^*) \tag{6}$$

As stated above, with the illustrative embodiment, the effective power current Iqx, that has been detected only from the DC current, is approximated as the torque current detection value Iq for compensation of a voltage potential drop due to the primary resistance based on this value; accordingly, the electric motor's generated torque becomes larger in low frequency regions, resulting in a likewise increase in power-up torque. Furthermore, since the slip frequency is corrected or amended, it becomes possible to suppress the velocity reduction even when the load gets larger.

Embodiment 2

Another embodiment for calculation of the torque current will next be explained. The 60° intervals I through VI shown in FIG. 5 are determined and then calculation of Equation 5 is performed to thereby arithmetically determine both the excitation current Id and torque current Iq.

(Interval I)

$$i\alpha = -ai\beta = (ia - 2ib)/\sqrt{3} \tag{7}$$

$$Id = i\alpha \cdot \cos(\theta d^* - 2\pi/3) + i\beta \cdot \sin(\theta d^* - 2\pi/3) \tag{8}$$

$$Iq = -i\alpha \cdot \sin(\theta d^* - 2\pi/3) + i\beta \cdot \sin(\theta d^* - 2\pi/3) \tag{9}$$

(Interval II)

$$i\alpha = ibi\beta = (2ia - ib)/\sqrt{3} \tag{10}$$

$$Id = i\alpha \cdot \cos\theta d^* + i\beta \cdot \sin\theta d^* \tag{11}$$

$$Iq = -i\alpha \cdot \sin\theta d^* + i\beta \cdot \cos\theta d^* \tag{12}$$

(Interval III)

$$i\alpha = -iai\beta = (ia - 2ib)/\sqrt{3} \tag{13}$$

$$Id = i\alpha \cdot \cos(\theta d^* - 4\pi/3) + i\beta \cdot \sin(\theta d^* - 4\pi/3) \tag{14}$$

$$Iq = -i\alpha \cdot \sin(\theta d^* - 4\pi/3) + i\beta \cdot \cos(\theta d^* - 4\pi/3) \tag{15}$$

(Interval IV)

$$i\alpha = ibi\beta = (2ia - ib)/\sqrt{3} \tag{16}$$

$$Id = i\alpha \cdot \cos(\theta d^* - 2\pi/3) + i\beta \cdot \sin(\theta d^* - 2\pi/3) \tag{17}$$

$$Iq = -i\alpha \cdot \sin(\theta d^* - 2\pi/3) + i\beta \cdot \cos(\theta d^* - 2\pi/3) \tag{18}$$

(Interval V)

$$i\alpha = -iai\beta = (ia - 2ib)/\sqrt{3} \tag{19}$$

$$Id = i\alpha \cdot \cos\theta d^* + i\beta \cdot \sin\theta d^* \tag{20}$$

$$Iq = -i\alpha \cdot \sin\theta d^* + i\beta \cdot \cos\theta d^* \tag{21}$$

(Interval VI)

$$i\alpha = ibi\beta = (2ia - ib)/\sqrt{3} \tag{22}$$

$$Id = i\alpha \cdot \cos(\theta d^* - 4\pi/3) + i\beta \cdot \sin(\theta d^* - 4\pi/3) \tag{23}$$

$$Iq = -i\alpha \cdot \sin(\theta d^* - 4\pi/3) + i\beta \cdot \cos(\theta d^* - 4\pi/3) \tag{24}$$

Here, $\theta d^*$ is a reference phase command shown in FIG. 7, ia is an output value of the sample-hold circuit 8a shown in FIG. 1, and ib is an output value of the sample-hold circuit 8b. Letting the torque current Iq as computed using Equations (7) to (24) be an input of the primary delay filter 14 of FIG. 7 makes it possible to perform the automatic torque boost control in a similar way. Additionally, Equations (7) to (24) are also used for calculation of Id, Iq directly from the sample-hold circuit output value(s), which in turn eliminates the necessity of obtaining individual instantaneous values of the inverter output current with respect to three phases thereof, thus enabling simplification of operational processing and control processes.

Note that discrimination of the 60° intervals I to VI shown in Equations (7) to (24) is achievable through relative comparison of instantaneous values of the three-phase AC voltage or from the phase of a voltage command(s). Alternatively the 60° intervals may be discriminated from the six kinds of gate states shown in FIGS. 6a to 6f as accepted or "imported" into the microcomputer. Additionally the excitation current Id is also detectable so that this may also be applied to velocity sensorless vector control schemes for controlling either an inverter output frequency or voltage so that Id is kept constant.

Embodiment 3

Figure 8:
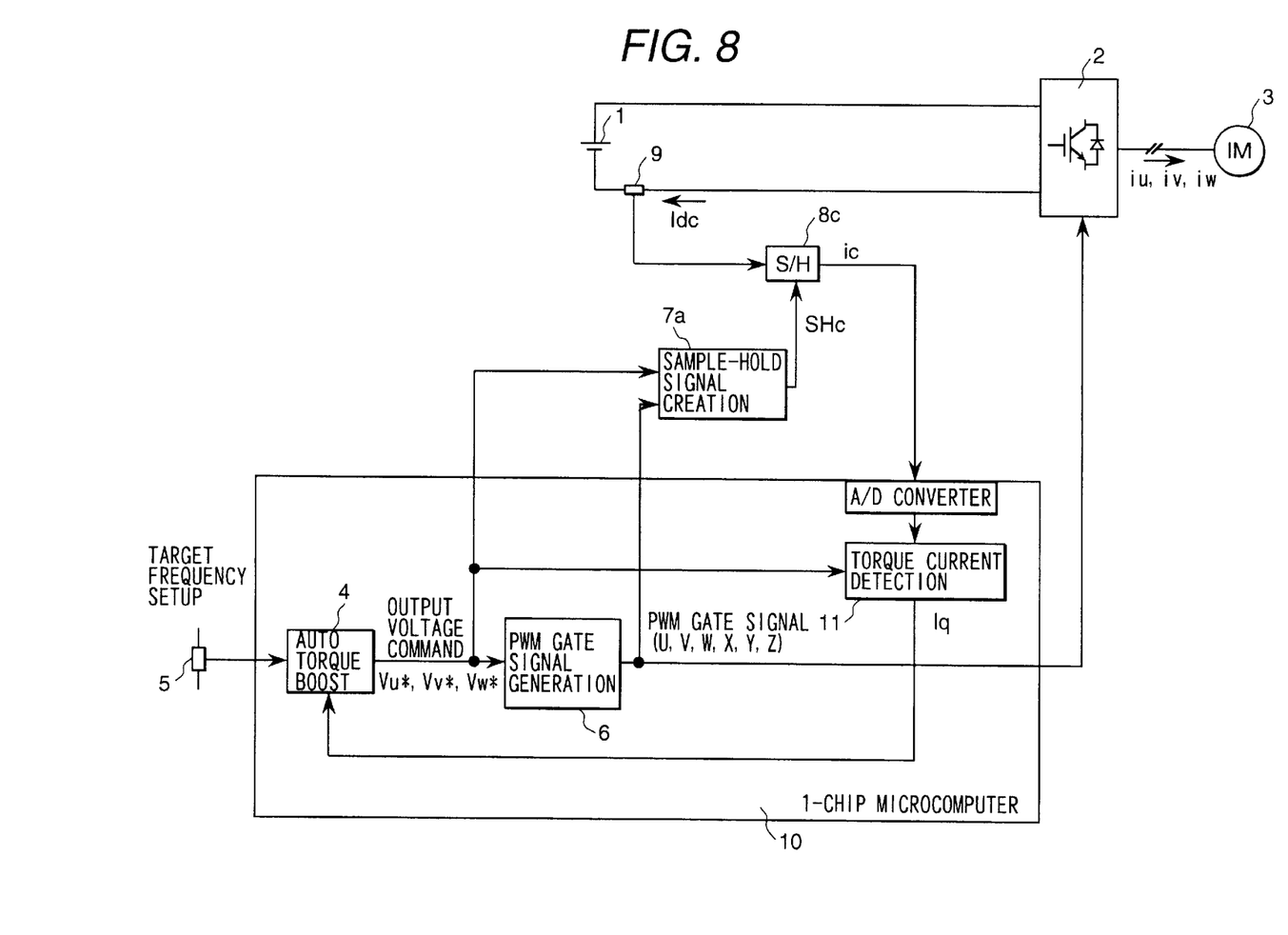
FIG. 8 is a block diagram showing another embodiment of the present invention.
Figure 9:
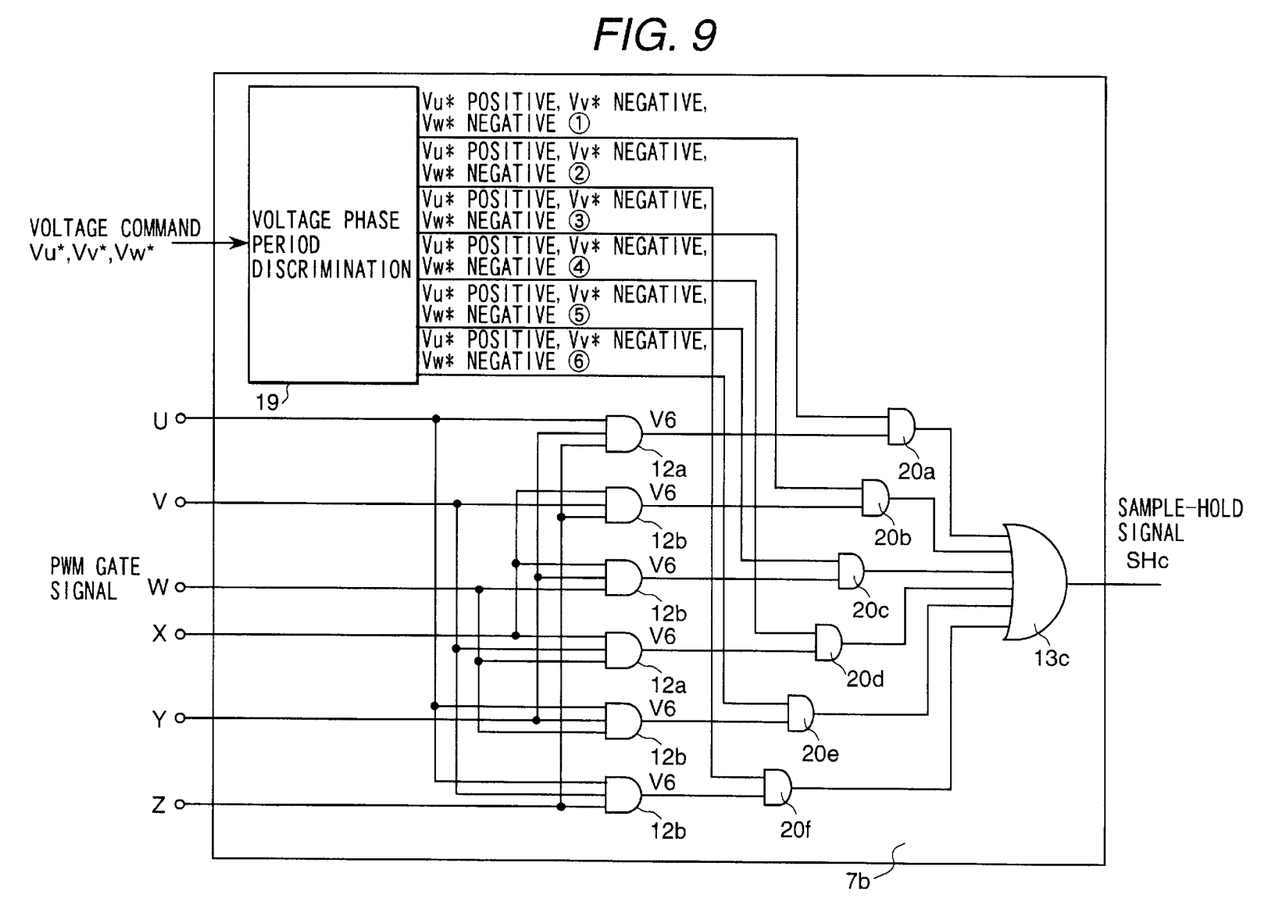
FIG. 9 is a schematic circuit diagram of a sample-hold signal creation means 7b shown in FIG. 8.
Figure 10:
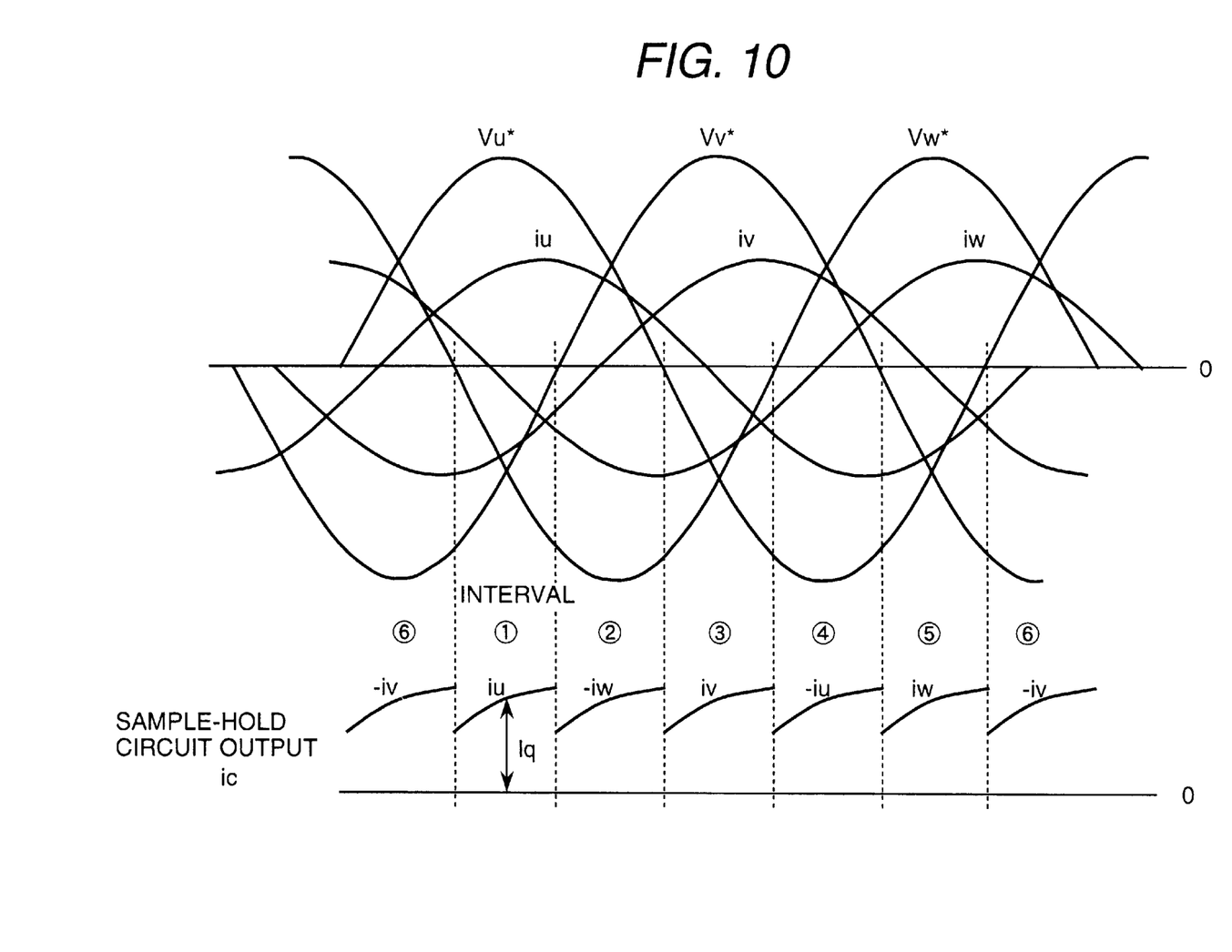
FIG. 10 is an output waveform diagram of a sample-hold circuit 8c shown in FIG. 8.

Next, another embodiment is shown in FIG. 8. This embodiment is different from the embodiment of FIG. 1 in that a single sample-hold circuit 8c is used and that the sample-hold signal creation means 7b is different in configuration. A detailed arrangement of the sample-hold signal creation means 7b is shown in FIG. 9. A voltage phase period discrimination means 19 is operable to discriminate each 60-degree voltage phase period from the positive and negative polarities of three-phase AC voltage commands Vu*, Vv*, Vw*. Next, logical multiplication of the six kinds of gate states of V1, V2, V3, V4, V5, V6 is performed by a voltage phase period discrimination signal to provide six resultant outputs, which are then subjected to addition at a logical sum circuit 13C to thereby generate and issue a sample-hold signal SHc. Waveforms of outputs ic of the sample-hold circuit 8c with the configuration of FIGS. 8 and 9 are shown in FIG. 10. A time interval (1) shown in FIG. 10 is the gate state of V6 shown in FIG. 2. Sampling an inverter DC input current in this state results in establishment of idc=iu; thus, iu is continuously output from 8c within this 60-degree period. Similarly, within an interval (2) shown in FIG. 10, a logical product with V4 is taken. In the V4's gate state shown in FIG. 2, sampling an inverter DC input current results in establishment of idc=−iw; thus, −iw is continuously output from 8c in this 60-degree period. As a result of this, the ic waveform is the one that varies in units of 60-degree periods within one cycle of the inverter output voltage as shown in FIG. 10. In this way, the sample-hold circuit's output is continuously and moderately variable while being identical to the electric motor current within the 60-degree phase period of the inverter output voltage phases; thus, it is possible to employ relatively low speed responsive A/D converters and/or the A/D converter as built in the microcomputer upon execution of A/D conversion of this signal for letting it be taken into the microcomputer. As a result, the intended control device of low cost may be realized.

In addition, in the waveforms of FIG. 10, the value of iu at the maximum value of Vu* of the interval (1), for example, is an effective power current and becomes a value that is equivalent to a torque current. Similarly, in the time interval (2)–(6) shown in FIG. 10, ic values near the maximum value and minimum value of each phase AC voltage are detectable as the effective power-equivalent current Iqx. As a result, there are similar effects as those of the embodiment 1 shown in FIG. 1, which in turn makes it possible to perform automatic torque boost control with increased accuracy even in low speed regions. In addition, the sample-hold circuit required becomes a single one when compared to the embodiment of FIG. 1, thus enabling reduction of production costs.

It should be noted that although the above-stated respective embodiments are arranged to employ an induction electric motor for use as the AC motor required, the present invention may also be applied to other cases where the inverter is used to control synchronous electric motors including, but not limited to, brushless DC motors using permanent magnets. Also, note that while in each of the aforesaid embodiments the DC input current is sample-held in accordance with the gate state of a negative arm switching element, this may alternatively be sample-held in accordance with the gate state of a positive arm switching element.

What is claimed is:

1. An inverter device comprising a three-phase inverter for converting DC electric power into AC power for supplement to an AC electric motor and a control device operatively associated therewith, wherein said control device comprises a first sample-hold circuit for sample-holding a DC input current of the inverter in a gate state for causing a positive side arm switching element or negative side arm switching element of the three-phase inverter to turn on within a time period corresponding to a single phase thereof while letting it turn off within periods corresponding to the remaining two phases, and a second sample-hold circuit for sample-holding a DC input current of the inverter in a gate state which causes it to turn on within periods corresponding to two phases while turning it off within a period corresponding to the remaining one phase, and also comprises means for varying an output frequency or output voltage of the inverter in accordance with output values of said first and second sample-hold circuits, the output values varying with a 120-degree phase period of inverter output voltage phases.

2. An inverter device as defined in claim 1 wherein said control device further comprises means for reducing the output frequency of the inverter when the sample-hold circuit output value goes beyond a preset level as established in advance.

3. An inverter device as defined in claim 1 wherein said control device further comprises means for calculating a torque current or an excitation current of the AC electric motor on the basis of a reference phase with an inverter frequency command integrated and said sample-hold circuit output value, and means for varying the output frequency or output voltage of the inverter in accordance with a calculated value of said torque current or excitation current.

4. An inverter device as defined in claim 1 wherein said control device further comprises means for varying the output frequency or output voltage of the inverter in accordance with said sample-hold circuit output values near a maximal value and a minimal value of each phase AC voltage of the inverter.

5. An inverter device of claim 1 wherein said control device further comprises means for varying the output frequency or output voltage of the inverter in accordance with an average change of the sample-hold circuit output value.

* * * * *